March 5, 1957 L. HORNBOSTEL 2,783,645
TORQUE METER
Filed May 8, 1953 2 Sheets-Sheet 2
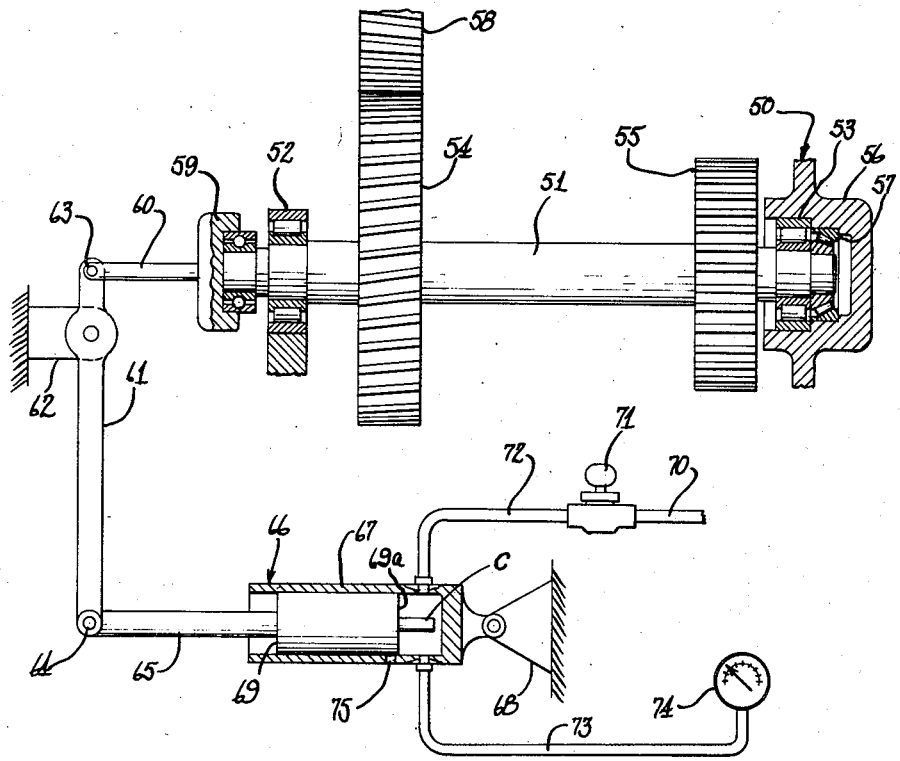
FIG. 2
FIG. 3
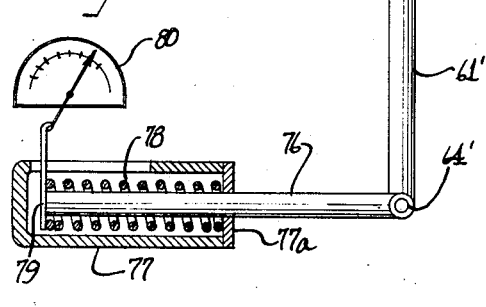
Inventor
Lloyd Hornbostel

United States Patent Office 2,783,645
Patented Mar. 5, 1957

2,783,645

TORQUE METER

Lloyd Hornbostel, Beloit, Wis., assignor to Beloit Iron Works, Beloit, Wis., a corporation of Wisconsin Application May 8, 1953, Serial No. 353,869

2 Claims. (Cl. 73—136)

This invention relates to the measurement of power and torque transmitted through a mechanical drive system, and more particularly, to the measurement of torque transmitted through a gear train.

If an electric drive mechanism is employed, it is a relatively simple matter to determine the power required to operate a piece of machinery since it is necessary only to measure the current and voltage applied to the motor for operating this machinery. In the case of a mechanical drive such as that which is employed in the operation of paper machines, however, there is no simple means for continuously determining the power being transmitted. As will be appreciated, it is of particular importance to be able to ascertain the power transmitted at various points in the rather elaborate gear trains employed in the operation of heavy machinery such as paper machines. This is particularly true in the case of the differential drive in paper machines; but the necessity for determining the power transmitted in gear trains is equally great in the case of various other gear units.

In the case of a pair of coacting gears having parallel axes and having teeth on the periphery of each which are in parallel alignment with the axes, the force transmitted from one gear to the other is essentially the mechanical rotary or turning force known as "torque." The essential force component is the torque component in such case and there is no force component axially aligned with one of said gears. On the other hand, in the case of almost all other types of gear systems such as helical, bevel, spiral and hypoid gears both torque and axially aligned forces are transmitted, so that the driving gear imparts to the driven gear an "end thrust" or force which is aligned with the axis of the driven gear. Such is also the case in connection with any number of other rotatable members which have a drive connection therebetween as, for example, in the case of a pulley and belt arrangement wherein the belt is not perfectly aligned with the pulleys. The particular relation between the torque force and the axially aligned force may be calculated from the design of the force transmitting means, and these two force components thus have a definite relationship which may be determined in the case of any particular type of force transmitting device. The instant invention involves apparatus for employing these facts in the measurement of power and/or torque transmitted.

It is, therefore, an important object of the instant invention to provide an improved apparatus for the measurement of power and/or torque in mechanical drive systems.

Another object of the instant invention is to provide an improved drive mechanism comprising a first member and a second member each mounted for rotation, said first member being urged toward one axial position but movable axially away from said one position, and a torque-transmitting drive connection between said members applying an axial force to said first member tending to move said first member axially away from said one position, said axial force being a predetermined function of the torque being transmitted between said members.

A further object of the instant invention is to provide an improved apparatus for measuring the torque transmitted to a shaft having a helical gear drive involving torque and axially aligned force transmission in simultaneous predetermined relation, that comprises means axially floating the rotating shaft to permit axial movement thereof in response to the axially aligned force transmitted and means subjecting said shaft to a controlled but variable force opposite to said axially aligned transmitted force to the extent necessary to maintain the shaft in a given axial location.

Other objects, features and advantages will become apparent to those skilled in the art from the following detailed disclosure of preferred embodiments of the instant invention, and the drawings appended hereto and made a part hereof.

On the drawings:

Figure 2 is a sectional elevational view of another embodiment of the instant invention; and Figure 3 is a sectional elevational view of a modified element adapted for use in the embodiment shown in Figure 2.

As shown on the drawings:

Figure 1:
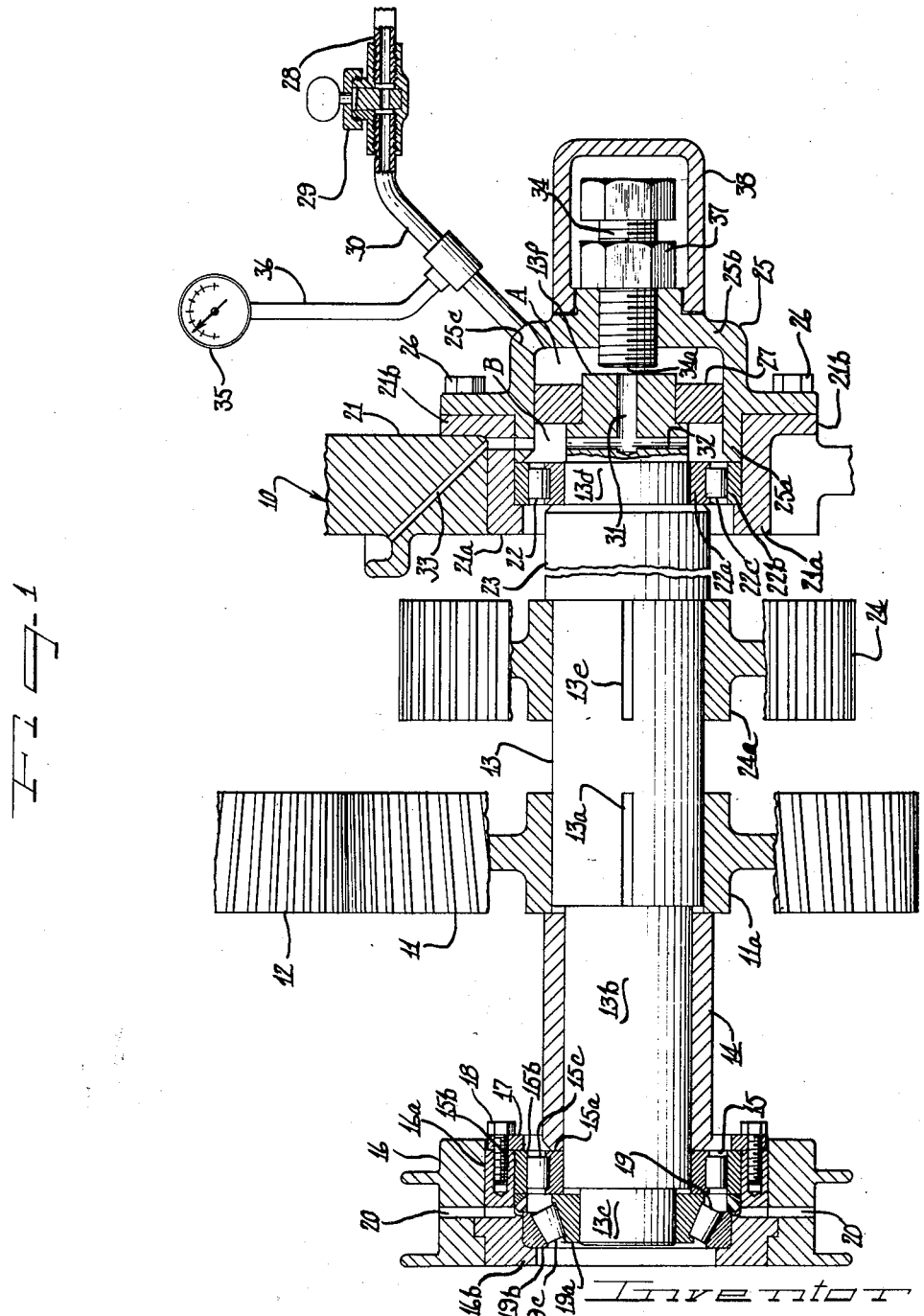
Figure 1 is a fragmentary sectional elevational view of a drive mechanism embodying the instant invention.

The reference numeral 10 indicates generally a drive mechanism embodying the instant invention, which comprises a first member or gear 11 and a second member or gear 12 (shown partially only), each being mounted for rotation. In the instant embodiment (Figure 1) the gear 12 is mounted on a drive shaft (not shown), and the gears 11 and 12 are helical gears thereby having a torque-transmitting drive connection between the gears 11 and 12 which applies an axial force to the gear 11 tending to move the gear 11 axially away from its present position. As was explained previously, the specific relationship between the torque transmitted and the axial force applied in a given gear system or other torque-transmitting device may be readily calculated from the design and arrangement of the drive mechanism.

In the embodiment of Figure 1, the driven gear 11 is suitably mounted on a shaft 13 by means of keyways (such as at 13a) which are fitted with internal keys in the hub portion 11a of the gear 11, so that the gear 11 is secured to the shaft 13 for rotation therewith and axial movement therewith.

A sleeve or spacer 14 is suitably mounted on a slightly reduced portion 13b of the shaft 13 and the sleeve 14 secures the driven gear 11 in position on the shaft 13 by engaging the hub portion 11a at one end. At the opposite end of the sleeve 14 a suitable straight roller bearing assembly 15 is positioned. The bearing assembly 15 comprises an inner bearing ring 15a mounted on the shaft 13, an outer bearing ring 15b and rollers 15c therebetween. This is a straight roller bearing assembly which permits limited axial movement of the shaft 13 rotatably supported thereby. The bearing assembly 15 is suitably mounted in a bearing housing 16, which has an inner sleeve 16a against which the outer bearing ring 15b is retained by means of a ring member 17 and threaded bolts 18 threadedly engaging the sleeve 16a and clamping the ring 17 against the inner side of the bearing assembly 15.

A thrust bearing assembly 19 is mounted within the housing 16 to cooperate with an additionally reduced extremity 13c of the shaft 13 to prevent axial movement in the direction of the bearing housing 16 while permitting limited axial movement in the opposite direction. The thrust bearing assembly 19 comprises an inner frustoconical ring 19a mounted on the reduced shaft portion 13c, a mating outer bearing ring 19b, and rollers 19c therebetween. The outer ring 19b is securely held against a shoulder portion 16b in the inner housing sleeve 16a, so as to prevent axial movement in the direction of the housing. Suitable oil conduits 20, 20 provide means for flowing oil through the housing 16 and inner sleeve 16a and between the bearing assemblies 15 and 19 to provide suitable lubrication for the operation of such bearing assemblies.

In the operation of the instant drive mechanism 10, the gears 11 and 12 are so designed and operated that the axial force or thrust imparted by the drive gear 12 to the driven gear 11 is directed away from the housing 16, since the thrust bearing assembly 19 prevents axial movement in the direction of the housing 16 but permits axial movement in the opposite direction.

As will be explained in detail, the bearing housing 21 at the end of the shaft 13 opposite to the end received by the bearing housing 16 is so designed that it operates to urge the shaft 13 and the driven gear 11 toward the housing 16 or toward an axial position approximately as shown in Figure 1 wherein the thrust bearing assembly 19 permits further axial movement in the direction of the housing 16. The arrangement within the bearing housing 21 thus tends to urge the shaft 13 and the driven gear 11 toward one axial position, but permits axial movement of the shaft 13 away from this axial position in the direction of the housing 21.

Referring now to the details of the housing 21, it will be seen that the housing is equipped with an inner ring 21a which retains a straight roller bearing assembly 22 comprising an inner ring 22a mounted on a reduced portion 13d of the shaft 13, an outer ring 22b engaging the sleeve 21a, and rollers 22c therebetween. The bearing assembly 22 like the bearing assembly 15 is a straight roller bearing assembly which permits limited axial movement.

It will also be noted that the inner ring 22a engages a spacer or sleeve 23 (functioning in the same manner as the spacer 14 at the opposite end of the shaft 13) which spacer 23 surrounds the reduced portion 13d of the shaft 13 and engages at one end thereof the inner bearing ring 22a and at the opposite end thereof the hub portion 24a of a spur gear 24, which is mounted like the gear 11 in keyways such as the keyway 13e and retained in such keyways 13e by the spacer 23. The spur gear 24 is driven by the shaft 13 and it in turn is a driving gear for another gear system (not shown). It will also be noted that the gear 24 has substantially axially aligned teeth therein, so that there is no axial force component involved in the transmission of torque through the gear 24. This leaves only the axial force component resulting from torque transmission between the gears 11 and 12 as an axially aligned force during the operation of the instant drive mechanism, so that the problem of calculating the torque transmitted to the shaft 13 may be simplified.

The inner housing sleeve 21a has an outwardly turned flange portion 21b to which is secured a housing 25 by means of flange bolts 26. As will be noted, the inwardmost portion 25a of the housing 25 clampingly engages the outer bearing ring 22b with the inner housing sleeve 21a to retain the same in position (axial movement through the bearing assembly 22 being accomplished by sliding of the rollers 22c on the inner periphery of the outer ring 22b). The housing 25 provides a closed generally cylindrical chamber extending from the bearing assembly 22 to the cap or head portion 25b of the housing 25 and separated into a front chamber A and a back chamber B by means of a piston member 27. As will be seen, the piston member 27 is an annular member mounted on the extreme reduced end portion 13f of the shaft 13; and the end portion 13f and the annular member 27 cooperate to define a piston axially received within the cylinder defined by the housing 25 and slidable therein in accordance with the axial movement of the shaft 13. Fluid under pressure in the outer chamber A tends to urge the piston and the shaft 13 axially in the direction of the opposite bearing housing 16.

In the operation of the instant device, a suitable fluid under pressure, such as lubricating oil in the embodiment here shown is fed through a pressure line 28 then through a control (or choke) valve 29 which functions as a letdown valve for the fluid under pressure, and then through an inlet line 30 which communicates with the chamber A through a suitable aperture 25c in the housing 25. As shown in the particular arrangement of Figure 1, the fluid then passes through an axially aligned port 31 in the shaft 13 and then through a plurality of radially aligned restricted ports 32 which provide communication between the axial port 31 and the inner chamber B. From the inner chamber B excess oil may flow outwardly through the oil port 33 passing through the members 25a, 21a and 21 (for returning the oil to the lubricating system).

During the operation of the instant device 10, however, a cap screw 34 is positioned in the housing 25 so that the inner face 34a of the screw 34 is closely adjacent the outer end or face of the shaft 13, so as to substantially close off the port 31. During operation of the drive mechanism 10, the coaction between the gears 11 and 12 causes the shaft 13 to be urged flush against the screw face 34a, thereby closing off the port 31. Also, during this operation, the oil under pressure flows through the choke valve 29 and into the chamber A. As soon as the oil pressure in the chamber A is sufficiently great to urge the shaft 13 toward the bearing housing 16, a small amount of oil may flow between the shaft end and the screw face 34a and into the port 31, thus relieving the pressure. By this operation, the pressure in chamber A is continuously that pressure which is sufficient to bias the shaft 13 in what amounts to a neutral position. The neutral position is a position wherein the shaft is substantially flush against the cap screw face 34a, thereby permitting only slight leakage to compensate for the tendency for pressure to build up in the chamber A, as a result of oil passing through the choke valve 29 from a pressure source (not shown) having substantially greater pressure than that contemplated for use in chamber A. This flow of oil is relatively slow, so that the gauge 35 which communicates with the inlet line 30 by the gauge line 36 may register substantially the fluid pressure in the chamber A. The area against which the fluid pressure is applied in chamber A may, of course, be readily calculated from the dimensions of the end of the shaft 13 and the outer face of the annular member 27, so that the total force exerted axially against the shaft 13 may be calculated. When the shaft 13 is biased or urged into neutral position, as described, the total force exerted by the fluid pressure is equal to the total force exerted by the axial force component generated by the coaction between the gears 11 and 12. This axial force component is a predetermined function of the torque generated or transmitted between the gears 11 and 12, and the torque transmitted may thus be calculated solely on the basis of the reading of the pressure gauge 35.

As will be noted, the cap screw 34 threadedly engages the housing head or end 25a, so that it may be adjusted axially to effect an adjustment of the neutral axial position for operation. A lock nut 37 may be used to hold the cap screw 34 in fixed position once adjustment is made; and a cap 38 is removably attached to the housing 25 so as to permit access to the cap screw when adjustment is necessary.

As will be appreciated, other indicator means including recording means, may be used in place of the gauge 35 to indicate the fluid pressure, to indicate the continuous changes in the fluid pressure, or even to indicate the torque transmitted as such (merely by changing the gradations or indicia in the gauge).

As previously explained, the fluid pressure urges the shaft in one axial direction toward a given "neutral" axial position, which is just slightly away from the cap screw face 34a; and the shaft is also being urged away from this axial position (and flush against the cap screw face 34a) by the axial force component generated during torque transmission. The fluid pressure generated force is thus a force which is resilient in nature, although it continuously urges the shaft 13 in one direction. The resilience of such fluid pressure may, of course, be greatly increased by the use of a gas (such as compressed air) instead of the oil to obtain the desired fluid pressure. Also, spring means may be used, as will be described in connection with Figure 3, to provide resilient means for urging the shaft 13 in the axial direction indicated. Also, the piston and cylinder arrangement may be reversed, if such is desired so that the cylinder, for example, might be affixed to the end of the shaft 13 and a non-movable piston might cooperate therewith, as those skilled in the art will readily appreciate.

In general, the torque transmitting drive connection between the two principal rotary members (as here shown the gears 11 and 12) must involve an axial force component as well as the force component involved in the torque transmission per se. The torque may thus be transmitted from the driving member 12 to the driven member 11 along the line of the surface engagement between the teeth mounted on each of such members 11 and 12. In a helical gear arrangement, this line is non-parallel to the axis of either of the gears 11 and 12 (the axes of the gears 11 and 12 being parallel), but this line lies in a plane (at the point of contact between the teeth) which plane is substantially parallel to the axes of both shafts. The force components in this plane may be resolved into a line of force that is perpendicular to a plane drawn through the axes of the two gears (which line of force is tangential to the driven gear 11 and provides the torque component) and a line of force which is parallel to the axes of the two gears, which is the axially aligned force component.

It will be appreciated that an axial force component is also generated in other types of gear systems such as the spiral, bevel or hypoid gears, in which cases the axes of the gears are not necessarily parallel nor are they necessarily intersecting axes. Each of these various gear systems has a specific axial arrangement between the gears as well as a specific tooth arrangement on the operating faces of the gears, as those skilled in the art know well; and in each case an axial force component is generated as well as the pure torque transmitting force component. Preferably in the operation of the instant invention the gears are not coaxial, so that relative limited axial movement of one of the gears may be easily provided for in accordance with the teachings of the instant invention; and one of the gears may be held against axial movement and the other may be mounted to permit limited axial movement.

It will thus be seen that in the instant invention, the shaft 13 is rotated so as to permit axial "floating" to a limited extent and this axial floating accommodates axial movement of the shaft in response to the axially aligned force component transmitted thereto. The shaft is also subjected to a controlled but variable force (preferably fluid pressure) opposing the axially aligned transmitted force to the extent necessary to maintain the shaft in a given axial location. The shaft is thus maintained in the "neutral" axial position by counterbalancing the constantly biasing force of the fluid pressure against the constantly biasing force resulting from the axially aligned transmitted power.

Referring now to Figure 2, it will be seen that the device 50 shown therein comprises a shaft 51 which is mounted for limited axial movement on a pair of straight roller bearings 52 and 53 and carries a pair of co-rotatable gears 54 and 55. The straight roller bearing 53 is housed in a bearing housing 56 which also contains a thrust bearing assembly 57 which prevents axial movement of the shaft 51 in the direction of the housing 50 (i. e., prevents axial movement past the thrust bearing assembly 57); but permits axial movement of the shaft 51 in the opposite direction. A helical drive gear 58 is meshed with the helical driven gear 54 to provide a torque transmitting drive connection between the gears 54 and 58, in the manner hereinbefore indicated. This torque transmission results in an axial force component, in this case in the direction toward the left and away from the bearing housing 50, in the manner hereinbefore indicated. A rotary, universal type joint 59 is connected to the end of the shaft 51 opposite the bearing housing 50 for axial movement therewith and a non-rotating connecting rod 60 is affixed to the non-rotating portion of the joint 59. The connecting rod 60 is pivotally connected to one end of a lever arm 61 which is mounted on the fixed fulcrum 62 near the pivot connection 63 with the connecting rod 60 and has a pivot connection 64 at the opposite end thereof. The pivot connection 64 is made with a connecting shaft 65 for a piston and cylinder assembly 66. In the piston and cylinder assembly 66, the cylinder 67 is fixedly mounted on a bracket 68 and the piston 69 connected to the piston rod 65 moves axially within the cylinder 67. The piston 69 and the cylinder 67 cooperate to define a fluid pressure chamber C on one side of the piston 69, and fluid under pressure from a source (not shown) is fed through a high pressure line 70, a choke valve 71 and an inlet line 72 into the chamber C. A pressure gauge line 73 also communicates with the chamber C and is terminated by a pressure gauge 74, so as to register the fluid pressure in the chamber C. The fluid pressure in the chamber C exerts force against the piston so as to urge the piston axially in the opposite direction to that direction which the axial transmitted force urges the piston 69. In other words, the axial force transmitted urges the shaft 51 to the left and by virtue of the lever arm 61 urges the piston 69 to the right, as shown in Figure 2. The fluid pressure in the chamber C urges the piston to the left. The neutral position for the piston is defined by means of a bleed-off aperture 75 in the wall of the cylinder 67. The bleed-off aperture is located adjacent the working face 69a of the piston 69, so that the accumulation of fluid pressure above and beyond that necessary to counterbalance the axial thrust transmitted to the shaft 51 will result in movement of the piston 69 a very slight distance to the left, so as to uncover the port 75. Excess pressure may thus be bled off through the port 75, until the pressure in the chamber C is just sufficient to balance the axial thrust on the shaft 51 and the piston 69 then moves the very slight distance to the right necessary to close the port 75. Actually, the pressure in the chamber C will drop just below that necessary to balance the piston and the piston, in moving the incremental distance necessary to close the port 75, will complete the necessary pressure buildup in the chamber C.

As another embodiment of the instant invention, the lever arm 61 might be equipped with a spring device, such as that shown in Figure 3, wherein the modified lever arm comparable to the lever arm 61 is indicated by the reference numeral 61', and the modified pivot is indicated by the reference numeral 64'. In the embodiment of Figure 3, a connecting rod 76 is pivotally connected to the lever arm 61' by means of the pivot 64' for axial movement in response to swinging movement of the lever arm 61'. The connecting rod 76 is received by a spring housing 77 having therein a spring 78 mounted to resist compression. The spring 78 is held between the housing end 77a (suitably apertured to receive the connecting rod 76) and a head member 79 secured to the free end of the connecting rod 76, so as to clamp the spring 78 between the members 77a and 79. The axial force component acting upon the shaft 51 (Figure 2) tends to swing the lever arm 61' so as to move the connecting rod 76 to the right; and the spring 78 resiliently presses against the head member 79 so as to urge the connecting rod 76 to the left, as shown in Figure 3. The amount of compression or compressive force exerted by the spring 78 in order to maintain a neutral axial position (for the shaft 51 as well as the connecting rod 76) may be measured by the gauge 80, in the usual manner, so as to obtain a reading indicating the total force of the axially aligned force component operating on the shaft 51. From the total of the axial force component, it is a simple matter to calculate the amount of torque (and from the amount of torque it is a simple matter to calculate the power transmitted between the gears 54 and 58 taking into consideration the speed of rotation). As shown in Figures 2 and 3, it is desirable to employ a lever arm 61 or 61' that is so fulcrumed that only a very small amount of movement of the connecting rod 60 is necessary in order to accomplish a rather substantial amount of movement by the piston rod 65 or the spring connecting rod 76, whichever the case may be, so that the readings of the gauges 74 or 80 may be obtained with additional accuracy, without the necessity of very substantial axial movement of the shaft 51 during operation.

It will be understood that modifications and variations may be effected without departing from the scope of the novel concepts of the present invention.

I claim as my invention:

1. A gear drive comprising a shaft rotatably mounted for limited axial movement, a pair of helical gears, one of said gears being co-rotatably mounted on said shaft and the other drivingly engaging said one gear to transmit torque and axially aligned forces therebetween, a piston connected to said shaft for axial movement therewith, a cylinder receiving said piston and defining therewith a fluid pressure chamber on one side of said piston, fluid pressure inlet and outlet means for said chamber, said fluid pressure outlet means being mounted in said piston and defining an outlet aperture on said one side of said piston, said chamber having an aperture axially aligned with said outlet aperture, and plug means in said chamber aperture projecting into said chamber presenting a face portion opposing said outlet aperture, said plug means being adjustably movable axially of said piston whereby said face portion may limit fluid pressure leakage through said outlet aperture.

2. A gear drive comprising a shaft rotatably mounted for limited axial movement, a pair of helical gears, one of said gears being co-rotatably mounted on said shaft and the other drivingly engaging said one gear to transmit torque and axially aligned forces therebetween, a piston connected to said shaft for axial movement therewith, a cylinder receiving said piston and defining therewith a fluid pressure chamber on one side of said piston, fluid pressure inlet and outlet means for said chamber, said fluid pressure outlet means being mounted in said piston and defining an outlet aperture on said one side of said piston, said chamber having an aperture axially aligned with said outlet aperture, and plug means in said chamber aperture projecting into said chamber presenting a face portion opposing said outlet aperture, said plug means being adjustably movable axially of said piston whereby said face portion may limit fluid pressure leakage through said outlet aperture, and indicator means connected to said chamber to indicate the fluid pressure therein.

References Cited in the file of this patent

UNITED STATES PATENTS

| | | |
|---|---|---|
| 1,272,041 | Herr | July 9, 1918 |
| 1,298,630 | Schmidt | Mar. 25, 1919 |
| 1,316,281 | Dalton | Sept. 16, 1919 |
| 2,386,367 | Taylor | Oct. 9, 1945 |
| 2,444,363 | Newcomb | June 29, 1948 |
| 2,517,038 | Sheffield | Aug. 1, 1950 |
| 2,578,474 | Haworth | Dec. 1, 1951 |